Figures 1, 2, 3:
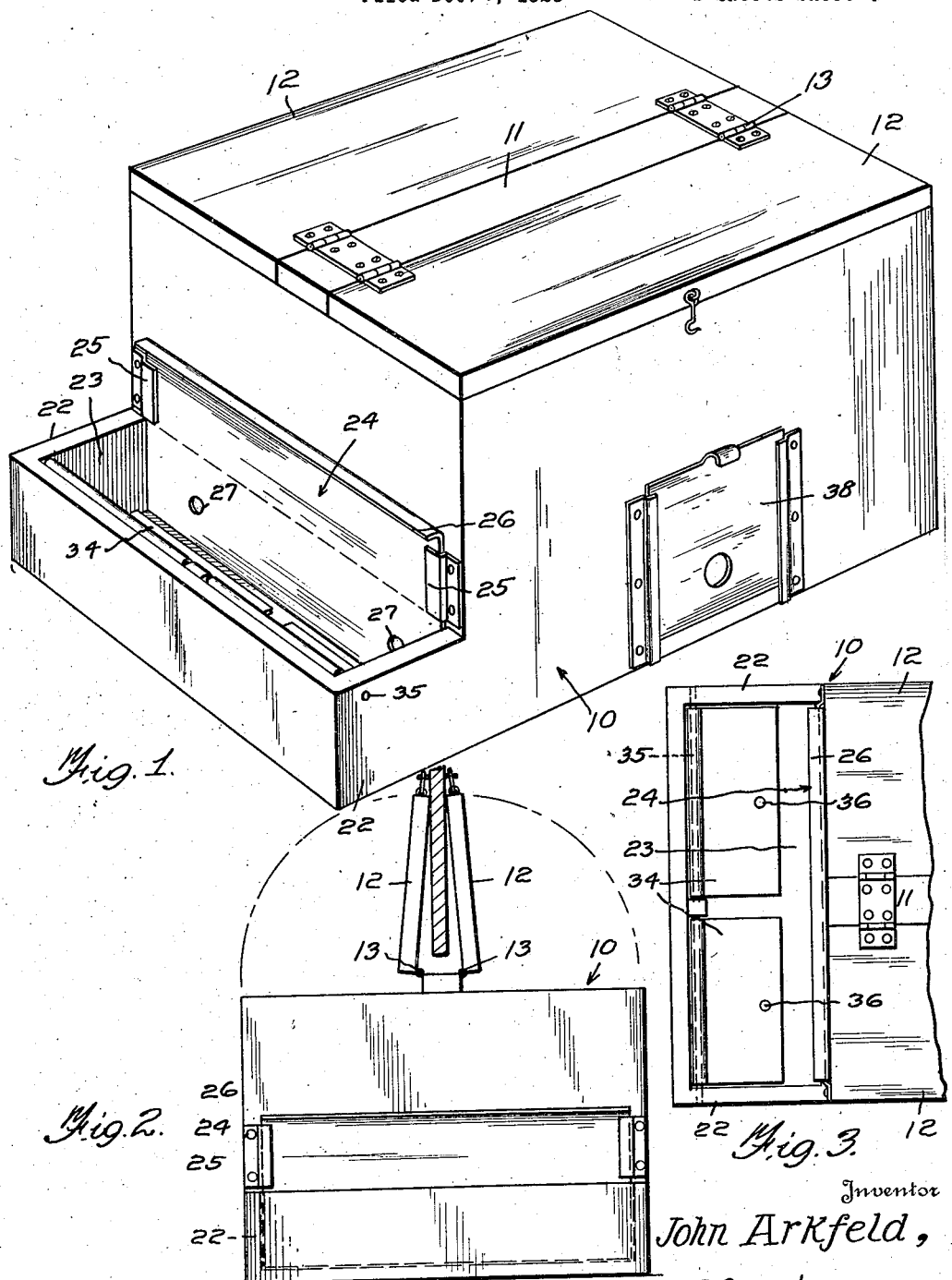

Oct. 11, 1927.

J. ARKFELD 1,644,660

ANIMAL DRINKING TROUGH

Filed Dec. 6, 1926

2 Sheets-Sheet 1

Inventor

John Arkfeld,

By

Attorney

Oct. 11, 1927.  
J. ARKFELD  
1,644,660  
ANIMAL DRINKING TROUGH  
Filed Dec. 6, 1926  
2 Sheets-Sheet 2
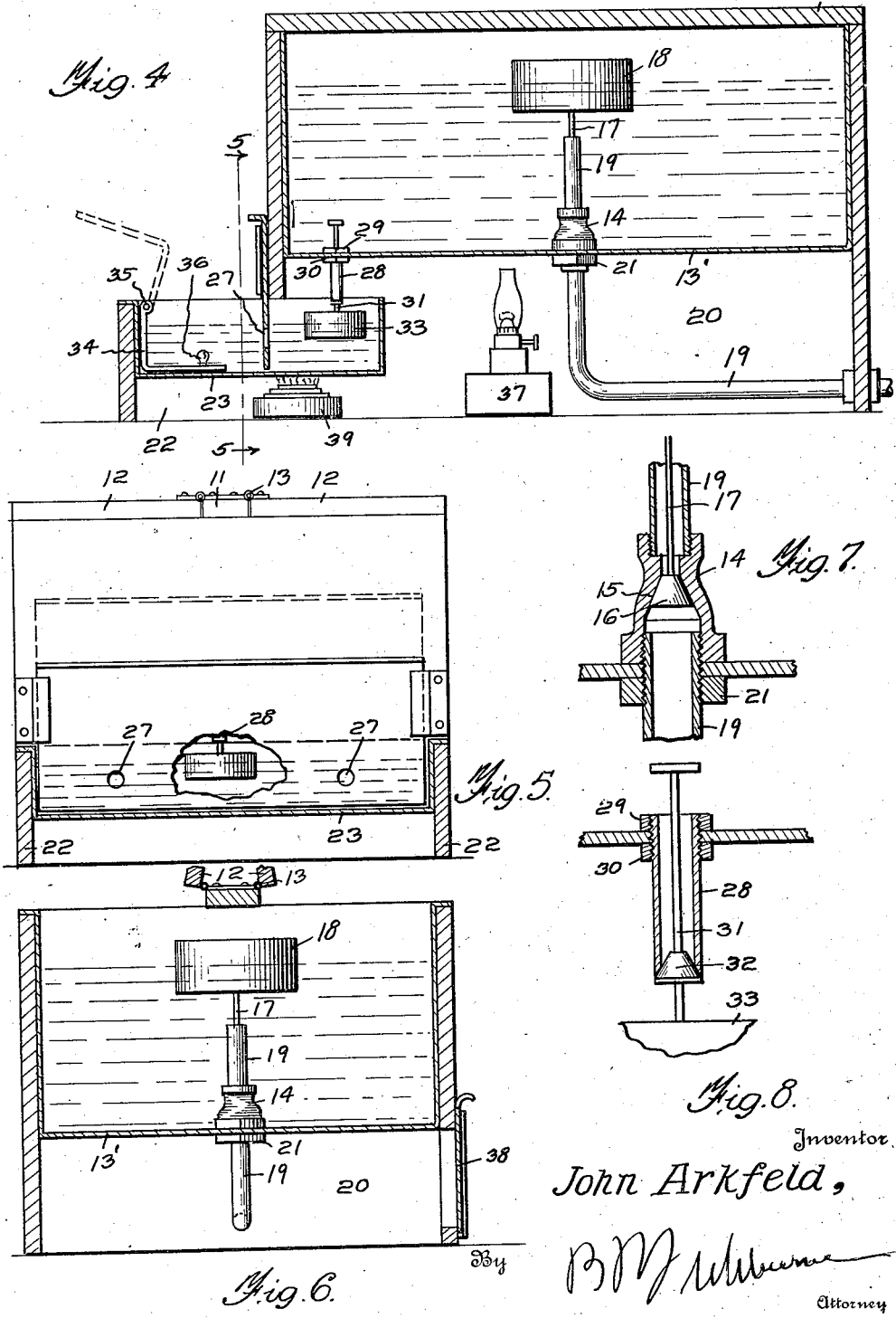
Inventor  
John Arkfeld,  
Attorney Patented Oct. 11, 1927.

1,644,660

UNITED STATES PATENT OFFICE.

JOHN ARKFELD, OF NORFOLK, NEBRASKA, ASSIGNOR TO LYMAN ARKFELD, OF OMAHA, NEBRASKA.

ANIMAL DRINKING TROUGH.

Application filed December 6, 1926. Serial No. 152,983.

My invention relates to improvements in animal drinking troughs.

The invention embodies a main trough, for use by cows, horses or other large stock, and a small or lower trough for use by pigs or the like receiving water from the larger or main trough. The water is supplied automatically to the main trough and a desired level is maintained and the main trough is preferably heated. Means are provided to withdraw the water from the main trough and supply the same to the lower trough and to maintain a constant level of water within the lower trough. Means are also provided for quickly and conveniently removing dirt or trash from the lower or hog trough.

Other objects and advantages of the invention will be apparent during the course of the following description.

In the accompanying drawings, forming a part of this specification, and in which like numerals are employed to designate like parts throughout the same, Figure 1 is a perspective view of the watering trough embodying my invention, Figure 2 is a front end elevation of the same, Figure 3 is a plan view of the same, parts broken away, Figure 4 is a central vertical longitudinal section through the apparatus, Figure 5 is a transverse section taken on line 5—5 of Figure 4, Figure 6 is a transverse section taken on line 6—6 of Figure 4, Figure 7 is a detailed section through the inlet valve of the main trough, and, Figure 8 is a similar view through the outlet valve of the main trough feeding the water to the hog trough.

In the drawings, wherein for the purpose of illustration is shown a preferred embodiment of my invention, the numeral 10 designates a box or casing, constituting the body portion of the apparatus. This casing is open at its bottom and is adapted to be arranged upon the ground or upon a suitable foundation. The top of the casing is covered by means of a stationary strip 11, attached thereto, and lids or covers 12, hinged to the strip 11, at 13. The covers are, of course, raised and held in the open position, by any suitable means. The strip 11 is arranged centrally of the casing and may be positioned at a fence or the like, with portions of the casing extending upon opposite sides of the fence, into different fields. Arranged within the top of the casing is a main drinking trough 13, formed of metal or the like. Attached to the bottom of this drinking trough is a vertical valve casing 14, having a valve seat 15, tapering upwardly for engagement with a tapered valve 16. The valve 16 is attached to a rod 17, extending upwardly and attached to a float 18. The rod 17 passes through a tube 19. The valve and float 18 are arranged beneath the central stationary strip 11 and are protected thereby. A water supply pipe 19 passes through the space 20 beneath the trough 13 and is bent upwardly and passes through an opening in the bottom of the trough and has screw-threaded engagement within the bottom of the valve casing 14, the same carrying a lock nut 21, beneath the bottom of the trough. It is thus seen that simple and reliable means are provided to automatically feed the water to the drinking trough and maintain the level constant therein, and the float and valve are arranged beneath the stationary strip 11 and protected thereby.

The sides of the casing or box 10 are provided near their bottoms with extensions 22, affording a lower casing, within which is mounted a lower hog drinking trough 23, formed of metal or the like. This hog drinking trough projects rearwardly into the body portion of the casing 10 and is overlapped by the upper trough 13, as shown. The numeral 24 designates a vertically movable slide or partition, the edges of which operate within stationary guides 25. This slide is provided at its top with a flange 26, so that it may be conveniently manipulated. When the slide 24 is in the lower position, it divides the trough 23 into an outer drinking compartment and an inner filling compartment. These two compartments have communication through openings 27 or the like, which are spaced from the bottom of the slide 24.

The valve structure for feeding the water from the forward end of the main trough 13 to the inner or rear compartment of the lower trough, embodies a vertical tube 28, extending through an opening in the bottom of the trough 13 and clamped thereto by nuts 29 and 30. The valve rod 31 passes through the tube 28 and carries an upwardly seating valve 32, engaging the lower end of the tube 28, as a valve seat. The rod 31 extends downwardly into the rear compartment of the trough 23 and is attached to a float 33, arranged within this compartment. It is, therefore, seen that the float 33 will actuate the valve 32 to maintain constant the level of the water in the trough 23. The slide 24 protects the float 33 and associated elements from the action of the hogs while drinking and by raising this slide, the operator may have access to the float and valve for adjustment, if necessary.

The slide or partition 24 also serves to retain dirt, trash or the like accumulating in the trough 23, in the forward compartment thereof. Arranged within this forward compartment are swinging cleaners 34, which are L-shaped, and fit in the forward corners of the trough. The upper ends of these cleaners are pivoted to a rod 35, secured to the trough. These cleaners are adapted to be swung forwardly, as indicated in Figure 4, and will hence lift the dirt or trash from the trough 23 and discharge the same therefrom. The cleaners are permanently attached to the trough 23 and can not become separated therefrom and are convenient to operate. If desired, small handles or knobs 36 may be attached to the bottom of these cleaners, for convenience of operation.

The water in the main trough 13 may be heated by means of a lamp 37, disposed in the space 20 and access is had to this lamp through a vertically movable door 38, Figure 1. If desired, a second lamp 39 may be employed to heat the lower trough 23 or this trough may receive heat from the lamp 37.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus described my invention, I claim:—

1. In an animal drinking apparatus, a trough, a movable partition dividing the same into a drinking compartment and a float compartment, a valve to supply water to the float compartment, a float within the float compartment and connected with the valve, and L-shaped cleaners separate from the partition and arranged within the drinking compartment and having their upper ends pivotally connected with the wall of the drinking compartment.

2. In an animal drinking trough, a lower trough, an upper trough extending over the inner portion of the lower trough and forming a permanent cover for the inner portion of the lower trough, a movable partition serving to divide the lower trough into outer and inner chambers, said partition having opening or openings formed therein, float control means for supplying water from the upper trough to the lower trough and positioned behind said partition, and an L-shaped cleaner positioned within the forward portion of the outer chamber of the lower trough and pivotally connected therewith, said cleaner being separate from and movable independently of said partition.

In testimony whereof I affix my signature.

JOHN ARKFELD.